Sept. 9, 1947.  W. R. P. DELANO  2,427,262
INFLATABLE SOLAR STILL
Filed Sept. 4, 1943
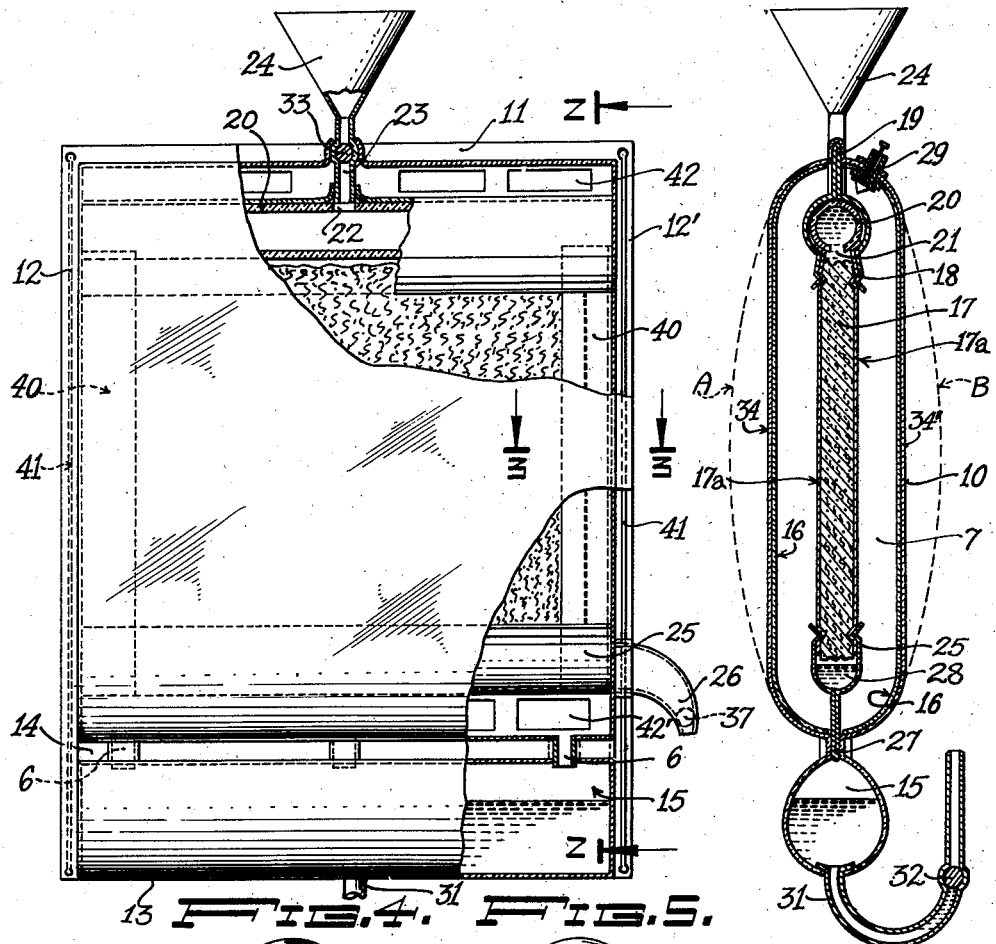
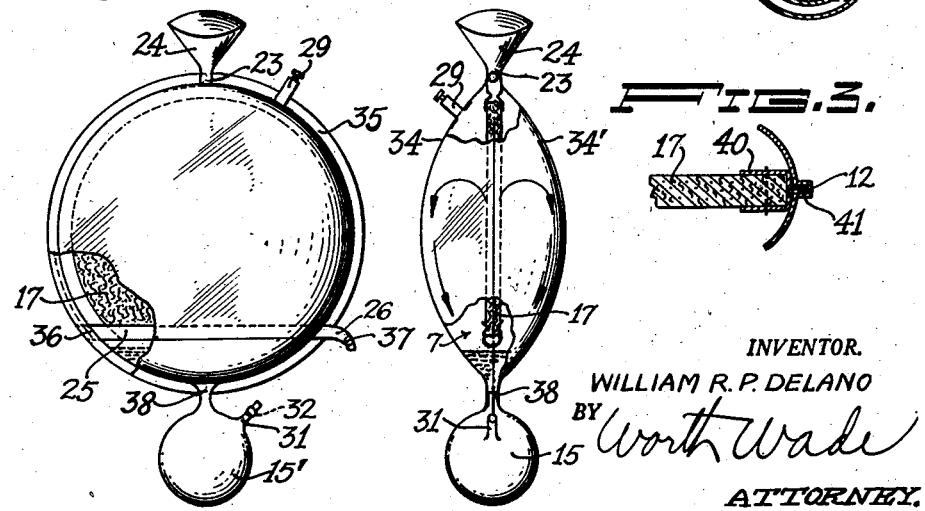
INVENTOR.
WILLIAM R. P. DELANO
BY Worth Wade
ATTORNEY.

Patented Sept. 9, 1947

2,427,262

UNITED STATES PATENT OFFICE 2,427,262

INFLATABLE SOLAR STILL

William R. P. Delano, Syosset, N. Y., assignor to Gallowhur Chemical Corporation, a corporation of New York Application September 4, 1943, Serial No. 501,219

20 Claims. (Cl. 202—185)

This invention relates in general to distillation and in particular to an apparatus for distilling liquids, in particular sea water, and to correlated improvements designed to render such an apparatus collapsible and portable.

The need of a simple and convenient method of distilling impure water, such as sea water, for the production of fresh water for drinking and the like has long been recognized, but this need becomes increasingly important during times of war when the destruction of ships and airplanes at sea forces the crews to take to lifeboats, rafts and floats. In such small lifesaving craft space is limited, methods of heating either non-existent or difficult to provide and all weight must be reduced to a minimum. Accordingly, any apparatus for distilling sea water to produce fresh water for drinking on lifesaving craft must meet, inter alia, the following stringent requirements:

1. The device must have a relatively low weight per unit of capacity. For example, when the apparatus is to be carried in aircraft and is to be used in a small rubber boat adapted only to carry two men, the weight of the distilling device should not exceed about twelve pounds and the capacity should be about two quarts per day.

2. Equally important as the weight is the space limitation involved in the transportation and in the use of the apparatus. The device must be compact and occupy a small space when not in use, i. e., when it is carried in an airplane, and when in use, it must be capable of efficient operation without occupying the space which would otherwise be available for an occupant of the lifesaving craft.

3. The device must be resistant to corrosion by sun, air, water and the action of the salts contained in sea water. It must also be fabricated of such material as will resist the rough handling incident to setting up and operating the apparatus under adverse weather conditions in crowded lifesaving craft.

4. The device should be capable of being erected without tools and by unskilled persons, and should be simple of operation.

5. The apparatus should be capable of being fabricated without the use of critical or scarce war material, such as metals, plastics and the like.

6. The device should operate upon a source of cheap, plentiful fuel without the use of an open flame which would create a fire hazard. It has long been realized that a plentiful source of fuel at sea is solar radiation for, under the most adverse weather conditions, there will be, on the average, several hours of sunlight per day in those areas of the ocean which are navigable and free from ice.

7. The fresh water produced should be free of salts, of harmful bacteria and should be substantially odorless and tasteless.

Accordingly, it is the general object of the present invention to provide an apparatus for the distillation of liquids, in particular, sea water which will satisfy the objects above described and meet the specifications recited.

It is a further object of the invention to provide a simple means for distilling sea water which is adapted for use on small lifesaving craft.

It is a further object to provide an apparatus for distilling sea water which will be collapsible, compact and light in weight, so that it can be carried in airplanes and installed as regular equipment in small lifesaving craft.

Other objects of the invention will in part be obvious and will in part appear hereinafter.

According to the present invention, there is provided an apparatus for distilling liquids, especially for distilling sea water for the production of fresh water, comprising the combination of a layer of absorbent material, means for saturating the layer with the liquid to be distilled, a closed container or envelope formed of flexible material in which the absorbent layer is disposed, a transparent window in the container and means for inflating the container with a gas so as to space the window from the layer of absorbent material.

For a more complete understanding of the nature and the objects of the invention, reference should be had to the accompanying drawing in which:

Fig. 1 is a side elevation, partly in section, of one embodiment of the distillation apparatus of the invention;

Fig. 2 is an end elevation, partly in section, of the apparatus of Fig. 1 taken along the line 2—2 thereof;

Fig. 3 is a cross-sectional view of one edge of the apparatus of Fig. 1 taken along the line 3—3 thereof;

Fig. 4 is a side elevation of a second embodiment of the apparatus of the invention; and Fig. 5 is an end elevation of the apparatus shown in Fig. 4.

In order to explain the essential elements of the appaartus, a detailed description first will be given of several embodiments before the general discussion thereof; but it is to be understood that the invention is not limited to these embodiments.

In that embodiment shown in Figs. 1, 2 and 3, the apparatus comprises a container or envelope designated generally by the numeral 10 which may, if desired, be formed of a single sheet of transparent liquid- and air impermeable material having the maximum width of the apparatus shown in Fig. 1 and having a length twice the length of the apparatus shown in Fig. 1, the material being folded in the middle and the two edges brought together at the top to form the top seam 11 and sealed along the sides to form the side seams 12 and 12', there being no seam at the bottom 13. The container thus formed is also sealed transversely at a point spaced from the bottom to form a seam 14 so as to produce a semi-confined space 15 hereinafter designated as the water collecting chamber. In making the seam 14, there is preferably disposed between the transparent layers of sheet material several short lengths of tubing 16 so that the chamber 15 will communicate with the chamber 7 through such tubing. There is centrally disposed in the chamber 7 a layer of absorbent material 17 enclosed at its upper end in a folded strip 18 of material which extends the full width of the container, the ends of the strip 18 being sealed and interleaved between the side seams 12 and 12'. The folded top edge 19 of the strip 18 is sealed within the top seam 11 as shown in Fig. 2. Between the seam 19 and adjacent the top of the absorbent layer 17, there is disposed within the strip 18 a stiff tube 20 having a longitudinal slot 21 in the bottom thereof and having a hole 22 at the center thereof disposed beneath the outlet tube 23 of a funnel 24 which extends through the seam 11 as shown in Fig. 1. The bottom of the absorbent layer 17 is also fastened between a folded strip 25 of material, one end of which is sealed between the side seams 12 and the other end extends through the side seam 12' to form an outlet spout 26 provided with a temporary closure such as a head 37. The bottom of the strip is folded and sealed over the area 27 so as to form a trough 28 whereas the bottom edge is sealed between the longitudinal seam 14. At some point in the wall of the chamber 7, there is disposed an air valve 29 by means of which the chamber 7 may be inflated with air or gas and, if desired, deflated. A valve of the type used on a bicycle tire is suitable for the purpose. The chamber 15 may also be provided at its lowermost point with a flexible outlet tube 31 formed of elastic material temporarily sealed with a bead 32. The neck 23 extending from the funnel 24 may also be temporarily sealed with a bead 33 or other suitable one-way valve.

As will be hereinafter described in detail, all the sheet materials used in constructing the apparatus shown in Figs. 1 and 2 may be formed of flexible sheet material except certain material used for the tubes 20 and 6. Thus, the apparatus in its uninflated condition may be completely collapsed and folded or rolled into a small compact mass. However, when the apparatus is to be used for distillation, the chamber 7 is inflated with air or gas through the valve 29 and the liquid to be distilled is fed through the funnel 24 and the neck 23 into the tube 20 from which it is distributed through the slot 21 to the top edge of the absorbent layer 17 until this layer is fully saturated. Any excess liquid from the layer 17 will be collected in the trough 28 and will drain through the spot 26. When the apparatus is disposed normal to the sun's rays, the rays passing through the transparent container will heat the layer 17 of the absorbent material causing the liquid to vaporize from the surface of the layer 17 and condense upon the inner surfaces of the walls 34 and 34' of the chamber 7. The condensed liquid will run down the inner walls of the chamber 7 and collect at the base from which it will run through the tube 6 and collect in the chamber 15 from which it may be discharged through the tube 31 by pinching this tube around the bead 32.

That embodiment shown in Figs. 4 and 5 is similar in construction to that shown in Fig. 1 and Fig. 2, the chamber 7 being formed of two circular sheets 34 and 34' of transparent impermeable material sealed along the periphery to form the continuous seam 35. In the seam 35 the neck 23 of the funnel 24 is sealed in in the same manner as in the apparatus of Fig. 1 whereas the strip 25 which anchors the bottom of the absorbent layer 17 is sealed in the seam 35 at the point 36 at one end while the other end of the strip 25 extends through the seam 35 at the right hand side to form the outlet 26 sealed with a bead 37. At the lowermost point of this apparatus there extends through the seam 35 a tube 38 which communicates with a chamber 15' which may be circular, said chamber being provided with an outlet tube 31' as shown in Figs. 4 and 5. The apparatus of Figs. 4 and 5 is inflated by means of the air valve 29' which does not extend through the seam 35 but is sealed through the wall of the layer 34 or 34'. When this embodiment is inflated, it will assume the shape shown in the end elevation of Fig. 5.

In Fig. 3 there is shown one method of anchoring the longitudinal side edges of the absorbent layer 17 into the seam 12 and 12' or alternatively into the seam 35 of the apparatus of Fig. 4. As shown in Fig. 3 the side edges of the layer 17 are enclosed within a folded strip of material 40, the folded edge of which extends within and is sealed to the longitudinal seam 12, 12' or 35. It is apparent therefore that the layer 17 is anchored to the walls of the chamber 7 at the top, the bottom and along the sides. Therefore when the chamber 7 is inflated, the layer 17 will be stretched taut between the seams and thereby disposed central within the chamber 7.

It will be apparent from the above detailed description that the apparatus comprises three main elements and several optional but desirable elements. The essential elements are (1) the transparent window, (2) the absorbent material, and (3) the shaping means, i. e. the means by which the article is given form and rigidity and proper disposition of the absorbent layer with respect to the window. Each of these elements will be described in detail hereinafter.

*The transparent window*

The sheet of transparent material forming the walls 34 and 34' shown in the apparatus of Fig. 1 should be a flexible but form-retaining sheet of any suitable transparent material, such, for example, as a cellulose ester, a cellulose ether, or a synthetic resin. Preferably, there is employed for this sheet material a transparent plastic which is permeable to visible and infra-red radiation such, for example, as cellulose acetate and cellulose aceto-butyrate. It is obvious that evaporation can take place from both the front and rear surfaces of the absorbent layer 17.

Since the transparent window divides the warm moist air of the interior from the cool dry air on the outside of the window, there will be normally a tendency of the window to become fogged by the condensation of droplets of water on the inner surface. Such droplets diffuse the light and decrease the radiation absorbed by the layer of absorbent material. Accordingly, it is desirable to retard or prevent fogging of the transparent window. This may be accomplished by forming the window of a transparent material combined on one or both sides with a layer of water-absorbent, that is hydrophilic material, which absorbs the condensed water and prevents it from remaining as individual droplets. For example, when the sheet of transparent material is formed of a saponifiable material, such, for example, as a cellulose ester or a synthetic resin formed from an ester such as vinyl acetate, vinyl chloride, methylmethacrylate, and glycerol-polybasic acid resins, such saponifiable materials may be superficially saponified by treatment with an inorganic alkali or an organic base to form a superficial layer of hydrophilic material. Alternatively, when the transparent window is formed of a non-saponifiable material, it may be coated with a hydrophilic film-forming material, such, for example, as viscose, gelatine, casein, polyvinyl alcohol, or the like, or it may be coated with a saponifiable material and the coating then saponified. Alternatively, the window is formed of a non-saponifiable material, it may be coated with a hydrophilic film-forming material, such, for example, as viscose, gelatine, casein, polyvinyl alcohol, or the like, or it may be coated with a saponifiable material and the coating then saponified. Alternatively, the window may be laminated on the interior and/or exterior to a self-sustaining film formed of a hydrophilic transparent material, such, for example, as Cellophane, gelatine, polyvinyl alcohol sheeting, and the like, the film being adhesively united to the transparent window by a suitable water-insoluble adhesive. Saponification may be in predetermined areas by masking the areas which are not to be saponified by means of a layer of paraffin which resists the saponification.

The absorbent layer

For the layer 17 of absorbent material, there may be employed a layer of a viscose sponge, a pile fabric, a layer of inter-felted fibres such, for example, as textile felt or a soft, porous paper which has been sized with a water-insoluble substance such, for example, as casein, a resin or a cellulose ester which does not disintegrate when wet. Since layer 17 should be capable of being washed and wrung out, it is preferably formed of a material having a sufficient tensile strength for this purpose, that is, a textile fabric or felt, or sponge.

The absorbent layer is preferably colored black to render it more heat-absorbent and this may be done by dyeing or pigmenting the absorbent material with a suitable black dye or carbon black. To insure that the fresh water is free of harmful bacteria, the absorbent layer is advantageously rendered bacteriostatic or fungistatic and germicidal by combining it, e. g. by impregnation or coating, with a suitable water-insoluble germicide such, for example, as a phenyl mercury compound, finely divided ionized heavy metals, such as silver, copper or gold, or by means of an organic substantially water-insoluble germicide such, for example, as copper naphthenates, phenyl mercury chloride, phenyl mercury hydroxy quinoline, and dichlorodihydroxymethane.

All other parts of the apparatus, such as the sheet 18, 25 and 40, may be formed of any flexible non-porous sheet material such, for example, as textile fabrics, felt or paper. Such materials should be stiffened and rendered waterproof by impregnating or coating them with a hydrophobic cellulose ester, cellulose ether, synthetic resin and the like. In general, all such sheet materials should be water impermeable.

Since most organic plastic materials contain residual voltatile solvents or volatile plasticizers, they tend to undergo changes in dimension when subjected to such temperatures as are generated by the sun's rays. Therefore, in the now preferred embodiment, the sheet materials, before or after being incorporated in the device, are subjected to a preshrinking treatment. The preshrinking is accomplished by subjecting the sheets or the apparatus incorporating such sheet materials to an elevated temperature sufficient to drive out the major proportion of the residual voltatile solvents or voltatile plasticizers so that these materials are given a dimensional stability. For example, if the transparent window is made of cellulose acetate butyrate and the backing sheet is made of a fabric coated with cellulose acetate butyrate, these sheet materials or the device incorporating them is baked at a temperature of 180° F. until there occurs no further change in the dimensions of such materials and the materials so treated may be considered as preshrunk. An apparatus incorporating such preshrunk materials may then be exposed to the sun's rays without causing a shrinkage of the transparent plastic as a result of which the tendency of the apparatus to embrittle or warp under the influence of the sun's rays is substantially prevented.

Various changes may be made in the apparatus without transcending the scope of the invention, for example:

(a) To provide for air circulation within the chamber 7 the seam 11 and 14 may be cut away in areas 42 and 42' as shown in Fig. 1.

(b) Additional stiffening means may comprise the metal rods 41 which may be sealed within the seams 12 and 12' as shown in Fig. 1.

(c) To avoid accidental dripping of undistilled liquid from the absorbent layer 17, this layer may be enclosed between transparent sheets 17a of a hydrophilic colloid such, for example, as Cellophane, gelatine, casein, and the like. The sheets 17a are kept in direct contact with the layer 17 by reason of the film of liquid between them. When the film 17a thus is in contact with the layer 17 and is wet with the liquid on the inner surface, distillation or evaporation takes place through the non-fibrous sheets 17a at substantially the same rate as from the uncovered surface of the layer 17.

This application is a continuation-in-part of my co-pending application Serial No. 465,366 filed November 12, 1942.

I claim:

1. Collapsible solar distillation apparatus comprising a chamber having walls formed of flexible material, at least a part of which are transparent, said chamber being foldable into a small volume, means for inflating said chamber to an extended operative form, flexible absorbent material located in said chamber in position to be exposed to solar radiation through said transparent wall on inflation of said chamber, means connecting said absorbent material to the walls of said chamber for extending the absorbent material on inflation of said chamber to said extended operative form, means for supplying liquid to be distilled to said absorbent material, and means for receiving distillate evaporated from the liquid supplied to said absorbent material.

2. In collapsible solar distillation apparatus a chamber formed of flexible material, at least a part of which is transparent, flexible absorbent material movable relative to the walls of said chamber and located within said chamber in position to be exposed to solar radiation passing through said transparent material, means for supplying liquid to be distilled to said absorbent material, means for inflating said chamber with a gas, and means connected to said chamber and to said absorbent material for maintaining said absorbent material in spaced relation with respect to the walls of said chamber on inflation of said chamber, whereby said apparatus may be inflated to an extended operative form or deflated and folded so as to occupy a small space.

3. In collapsible solor distillation apparatus a chamber formed of flexible transparent material, flexible absorbent material located within said chamber, means for supplying liquid to be distilled to said absorbent material, valve controlled means for inflating said chamber with a gas, and means connected to said chamber and to said absorbent material for maintaining said absorbent material extended and in spaced relation with respect to the walls of said chamber and in position to be exposed to solar radiation passing through said transparent material on inflation of the chamber, whereby said apparatus may be inflated to an extended, operative form or deflated and folded so as to occupy a small space.

4. In solar distillation apparatus an inflatable flexible envelope at least a portion of which is transparent, a flexible evaporator pad positioned to extend transversely of the envelope when inflated, with its edges spaced from the walls of the envelope, and means extending from points near the edges of said pad to the walls of the envelope for spreading and supporting the pad on inflation of the envelope.

5. Solar distillation apparatus comprising a single inflatable transparent envelope formed of flexible material and having a flexible evaporator pad suspended within the envelope out of contact with the walls of the envelope when inflated, means for supplying said pad with sea water to be distilled, means communicating with said envelope for collecting pure water distilled off from said sea water and means for inflating and deflating said envelope to permit said apparatus to be folded so as to occupy a small space and to be inflated to an extended operative form.

6. Solar distillation apparatus comprising an inflatable transparent envelope formed of flexible material and having an evaporator pad suspended within the envelope out of contact with the walls of the envelope when inflated, means for supplying sea water to be distilled to the upper portion of said pad, means communicating with said envelope for collecting pure water distilled off from the sea water, and means for inflating said envelope whereby it may be folded so as to occupy a small space but is inflatable to an extended operative form.

7. Solar distillation apparatus comprising an inflatable transparent envelope formed of flexible material and having an evaporator pad supported therein out of contact with the walls of the envelope when inflated, means connected to the upper portion of said envelope for supplying sea water by gravity to said pad, a collector for receiving fresh water produced by distillation of said sea water communicating with said envelope adjacent the lowermost portion thereof, means for detachably connecting said collector to said envelope, and means for inflating said envelope whereby it may be folded so as to occupy a small space but is inflatable to an extended operative form.

8. A solar distiller comprising an evaporator of flexible material adapted to contain water to be distilled, condensing means comprising a light-transmitting inflatable envelope of flexible material within which the evaporator is contained, means for supporting the evaporator in spaced relation to the envelope, and means for receiving liquid distilled off from said evaporator.

9. A collapsible, solar distiller comprising a flexible transparent envelope adapted to be inflated to cause the envelope to assume a distended shape, an evaporator comprising a pad of absorbent material adapted to be saturated with water to be distilled, means for supporting the evaporator within the envelope in spaced relation thereto to permit water vapor to be evolved from both faces of said pad to be condensed on substantially the entire interior surface of said envelope and means for receiving liquid thus condensed.

10. A solar distiller comprising an evaporator of flexible material adapted to contain water to be distilled, a transparent flexible and inflatable envelope, means for supporting the evaporator within the envelope, and a water-collecting chamber having limited communication with the interior of the envelope for receiving water condensed on the interior surface of said envelope.

11. A solar distiller comprising an inflatable and substantially airtight flexible transparent envelope having means for inflating the same, an evaporator of flexible material adapted to contain water to be distilled, means for supporting the evaporator within the envelope substantially out of contact therewith, and a water-collecting chamber of flexible material attached to the bottom of the envelope and having a common wall therewith, said wall having an aperture to provide restricted communication between the envelope and chamber permitting flow of condensed water into the chamber while substantially preventing return of collected water by splashing.

12. A solar distiller comprising an evaporator adapted to contain water to be distilled, and a condenser for water vapor evolved from the evaporator, said condenser comprising a transparent flexible envelope adapted to be supported in spaced relation to the evaporator and having on its inner surface a coating of polyvinyl alcohol to induce film-type condensation of water vapor thereon.

13. An apparatus according to claim 1 in which said chamber is divided adjacent its lower end to provide a reservoir for the distillate.

14. An apparatus according to claim 1 in which a reservoir for the distillate is fixed to the base of said chamber and communicates with the interior thereof.

15. An apparatus according to claim 1 in which the front and back walls of the apparatus are formed from a single sheet of transparent impermeable material which is folded in the middle to form the lower portion of said chamber.

16. An apparatus according to claim 1 in which the front and back walls of said chamber are formed by superimposing two parallel sheets of water-impermeable transparent material, the sheets being sealed together at the periphery.

17. An apparatus according to claim 1 in which the transparent window is formed of a sheet of hydrophobic plastic material having a layer of hydrophilic material on the inner surface thereof.

18. An apparatus according to claim 1 in which the transparent window comprises a sheet of saponifiable organic plastic material having the inner surface superficially saponified.

19. An apparatus according to claim 1 in which the absorbent layer is combined with a water-insoluble germicide.

20. An apparatus according to claim 1 in which the transparent wall and the sheet of water-impermeable material are preshrunk materials.

WILLIAM R. P. DELANO.

REFERENCES CITED

The following references are of record in the file of this patent:

UNITED STATES PATENTS

| Number | Name | Date |
|---|---|---|
| 511,472 | Sumovski | Dec. 26, 1893 |
| 1,812,516 | Dooley | June 30, 1931 |

FOREIGN PATENTS

| Number | Country | Date |
|---|---|---|
| 840,926 | France | Jan. 28, 1939 |
| 820,705 | France | Aug. 9, 1937 |